(12) United States Patent
Hippo et al.

(10) Patent No.: US 8,114,177 B2
(45) Date of Patent: Feb. 14, 2012

(54) CO-FEED OF BIOMASS AS SOURCE OF MAKEUP CATALYSTS FOR CATALYTIC COAL GASIFICATION

(75) Inventors: Edwin J. Hippo, Round Lake, IL (US); Pattabhi K. Raman, Long Grove, IL (US)

(73) Assignee: Greatpoint Energy, Inc., Cambridge, MA (US)

( * ) Notice: Subject to any disclaimer, the term of this patent is extended or adjusted under 35 U.S.C. 154(b) by 449 days.

(21) Appl. No.: 12/395,372

(22) Filed: Feb. 27, 2009

(65) Prior Publication Data

US 2009/0217588 A1 Sep. 3, 2009

Related U.S. Application Data

(60) Provisional application No. 61/032,697, filed on Feb. 29, 2008.

(51) Int. Cl.
*C01B 3/32* (2006.01)
*C01B 3/38* (2006.01)
*C10J 3/00* (2006.01)
*B09B 3/00* (2006.01)

(52) U.S. Cl. ......... 48/197 R; 48/197 A; 48/200; 48/202; 48/209; 48/210; 48/211; 48/214 A; 252/373

(58) Field of Classification Search ................ 48/127.1, 48/197 R, 204, 198.7, 61, 197 A, 200, 202, 48/209, 210, 211, 214 A; 423/650; 252/373
See application file for complete search history.

(56) References Cited

U.S. PATENT DOCUMENTS

| | | |
|---|---|---|
| 2,813,126 A | 11/1957 | Tierney |
| 2,886,405 A | 5/1959 | Benson et al. |
| 3,114,930 A | 12/1963 | Oldham et al. |
| 3,435,590 A | 4/1969 | Smith |
| 3,531,917 A | 10/1970 | Grunewald et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,759,036 A | 9/1973 | White |
| 3,779,725 A | 12/1973 | Hegarty et al. |
| 3,828,474 A | 8/1974 | Quartulli |
| 3,847,567 A | 11/1974 | Kalina et al. |
| 3,904,386 A | 9/1975 | Graboski et al. |

(Continued)

FOREIGN PATENT DOCUMENTS

CA 966660 4/1975

(Continued)

OTHER PUBLICATIONS

U.S. Appl. No. 12/778,538, filed May 12, 2010, Robinson, et al.

(Continued)

*Primary Examiner* — Wayne Langel
*Assistant Examiner* — Syed Iqbal
(74) *Attorney, Agent, or Firm* — McDonnell Boehnen Hulbert & Berghoff LLP

(57) ABSTRACT

Continuous processes are provided for converting a carbonaceous feedstock comprising biomass containing alkali metal, non-biomass components, and at least one gasification catalyst including an alkali metal recovered from solid char, into a plurality of gaseous products including methane and at least one or more of hydrogen, carbon monoxide, and other higher hydrocarbons.

6 Claims, 1 Drawing Sheet

U.S. PATENT DOCUMENTS

| | | |
|---|---|---|
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,969,089 A | 7/1976 | Moss et al. |
| 3,975,168 A | 8/1976 | Gorbaty |
| 3,985,519 A | 10/1976 | Kalina et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,021,370 A | 5/1977 | Harris et al. |
| 4,046,523 A | 9/1977 | Kalina et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,235,044 A | 11/1980 | Cheung |
| 4,243,639 A | 1/1981 | Haas et al. |
| 4,260,421 A | 4/1981 | Brown et al. |
| 4,265,868 A | 5/1981 | Kamody |
| 4,284,416 A | 8/1981 | Nahas |
| 4,292,048 A | 9/1981 | Wesselhoft et al. |
| 4,315,758 A | 2/1982 | Patel et al. |
| 4,318,712 A | 3/1982 | Lang et al. |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,347,063 A | 8/1982 | Sherwood et al. |
| 4,348,486 A | 9/1982 | Calvin et al. |
| 4,348,487 A | 9/1982 | Calvin et al. |
| 4,353,713 A | 10/1982 | Cheng |
| 4,365,975 A | 12/1982 | Williams et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,432,773 A | 2/1984 | Euker, Jr. et al. |
| 4,433,065 A | 2/1984 | Van Der Burgt et al. |
| 4,436,531 A | 3/1984 | Estabrook et al. |
| 4,439,210 A | 3/1984 | Lancet |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,500,323 A | 2/1985 | Siegfried et al. |
| 4,508,544 A | 4/1985 | Moss |
| 4,515,604 A | 5/1985 | Eisenlohr et al. |
| 4,515,764 A | 5/1985 | Diaz |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,597,775 A | 7/1986 | Billimoria et al. |
| 4,597,776 A | 7/1986 | Ullman et al. |
| 4,604,105 A | 8/1986 | Aquino et al. |
| 4,609,456 A | 9/1986 | Deschamps et al. |
| 4,617,027 A | 10/1986 | Lang |
| 4,619,864 A | 10/1986 | Hendrix et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,822,935 A | 4/1989 | Scott |
| 4,848,983 A | 7/1989 | Tomita et al. |
| 4,854,944 A | 8/1989 | Strong |
| 4,861,360 A | 8/1989 | Apffel |
| 4,876,080 A | 10/1989 | Paulson |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,720,785 A | 2/1998 | Baker |
| 5,733,515 A | 3/1998 | Doughty et al. |
| 5,776,212 A | 7/1998 | Leas |
| 5,855,631 A | 1/1999 | Leas |
| 5,865,898 A | 2/1999 | Holtzapple et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,180,843 B1 | 1/2001 | Heinemann et al. |
| 6,187,465 B1 | 2/2001 | Galloway |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,855,852 B1 | 2/2005 | Jackson et al. |
| 6,894,183 B2 | 5/2005 | Choudhary et al. |
| 6,955,695 B2 | 10/2005 | Nahas |
| 7,074,373 B1 | 7/2006 | Warren et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0076568 A1* | 4/2005 | Stigsson ............... 48/197 FM |
| 2005/0107648 A1 | 5/2005 | Kimura et al. |
| 2005/0137442 A1 | 6/2005 | Gajda et al. |
| 2006/0265953 A1 | 11/2006 | Hobbs |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0277437 A1 | 12/2007 | Sheth |
| 2009/0048476 A1 | 2/2009 | Rappas et al. |
| 2009/0090055 A1 | 4/2009 | Ohtsuka |
| 2009/0090056 A1 | 4/2009 | Ohtsuka |

| | | | | | | |
|---|---|---|---|---|---|---|
| 2009/0165361 | A1 | 7/2009 | Rappas et al. | JP | 2000290670 | 10/2000 |
| 2009/0165376 | A1 | 7/2009 | Lau et al. | JP | 2002105467 | 4/2002 |
| 2009/0165379 | A1 | 7/2009 | Rappas | JP | 2004292200 | 10/2004 |
| 2009/0165380 | A1 | 7/2009 | Lau et al. | JP | 2004298818 | 10/2004 |
| 2009/0165381 | A1 | 7/2009 | Robinson | WO | WO 00/43468 | 7/2000 |
| 2009/0165382 | A1 | 7/2009 | Rappas et al. | WO | WO 02/40768 | 5/2002 |
| 2009/0165383 | A1 | 7/2009 | Rappas et al. | WO | WO 02/079355 | 10/2002 |
| 2009/0165384 | A1 | 7/2009 | Lau et al. | WO | WO 03/033624 | 4/2003 |
| 2009/0166588 | A1 | 7/2009 | Spitz et al. | WO | WO 2004/072210 | 8/2004 |
| 2009/0169448 | A1 | 7/2009 | Rappas et al. | WO | WO 2006/031011 | 3/2006 |
| 2009/0169449 | A1 | 7/2009 | Rappas et al. | WO | WO 2007/005284 | 1/2007 |
| 2009/0170968 | A1 | 7/2009 | Nahas et al. | WO | WO 2007/047210 | 4/2007 |
| 2009/0217575 | A1 | 9/2009 | Raman et al. | WO | WO 2007/076363 | 7/2007 |
| 2009/0217582 | A1 | 9/2009 | May et al. | WO | WO 2007/128370 | 11/2007 |
| 2009/0217584 | A1 | 9/2009 | Raman et al. | WO | WO 2007/143376 | 12/2007 |
| 2009/0217585 | A1 | 9/2009 | Raman et al. | WO | WO 2008/073889 | 6/2008 |
| 2009/0217586 | A1 | 9/2009 | Rappas et al. | WO | WO 2009/018053 | 2/2009 |
| 2009/0217587 | A1 | 9/2009 | Raman et al. | WO | WO 2009/048723 | 4/2009 |
| 2009/0217588 | A1 | 9/2009 | Hippo et al. | WO | WO 2009/048724 | 4/2009 |
| 2009/0217589 | A1 | 9/2009 | Robinson | WO | WO 2009/086361 | 7/2009 |
| 2009/0217590 | A1 | 9/2009 | Rappas et al. | WO | WO 2009/086362 | 7/2009 |
| 2009/0218424 | A1 | 9/2009 | Hauserman | WO | WO 2009/086363 | 7/2009 |
| 2009/0220406 | A1 | 9/2009 | Rahman | WO | WO 2009/086366 | 7/2009 |
| 2009/0229182 | A1 | 9/2009 | Raman et al. | WO | WO 2009/086367 | 7/2009 |
| 2009/0246120 | A1 | 10/2009 | Raman et al. | WO | WO 2009/086370 | 7/2009 |
| 2009/0259080 | A1 | 10/2009 | Raman et al. | WO | WO 2009/086372 | 7/2009 |
| 2009/0260287 | A1 | 10/2009 | Lau | WO | WO 2009/086374 | 7/2009 |
| 2009/0324458 | A1 | 12/2009 | Robinson et al. | WO | WO 2009/086377 | 7/2009 |
| 2009/0324459 | A1 | 12/2009 | Robinson et al. | WO | WO 2009/086383 | 7/2009 |
| 2009/0324460 | A1 | 12/2009 | Robinson et al. | WO | WO 2009/086407 | 7/2009 |
| 2009/0324461 | A1 | 12/2009 | Robinson et al. | WO | WO 2009/086408 | 7/2009 |
| 2009/0324462 | A1 | 12/2009 | Robinson et al. | WO | WO 2009/111330 | 9/2009 |
| 2010/0071262 | A1 | 3/2010 | Robinson et al. | WO | WO 2009/111331 | 9/2009 |
| 2010/0076235 | A1 | 3/2010 | Reiling et al. | WO | WO 2009/111332 | 9/2009 |
| 2010/0120926 | A1 | 5/2010 | Robinson et al. | WO | WO 2009/111335 | 9/2009 |
| 2010/0121125 | A1 | 5/2010 | Hippo et al. | WO | WO 2009/111342 | 9/2009 |
| 2010/0168494 | A1 | 7/2010 | Rappas et al. | WO | WO 2009/111345 | 9/2009 |
| 2010/0168495 | A1 | 7/2010 | Rappas et al. | WO | WO 2009/124017 | 10/2009 |
| 2010/0179232 | A1 | 7/2010 | Robinson et al. | WO | WO 2009/124019 | 10/2009 |
| | | | | WO | WO 2009/158576 | 12/2009 |
| | | FOREIGN PATENT DOCUMENTS | | WO | WO 2009/158579 | 12/2009 |
| | | | | WO | WO 2009/158580 | 12/2009 |
| CA | | 1003217 | 1/1977 | WO | WO 2009/158582 | 12/2009 |
| CA | | 1106178 | 8/1981 | WO | WO 2009/158583 | 12/2009 |
| CA | | 1187702 | 6/1985 | WO | WO 2010/033846 | 3/2010 |
| CN | | 1477090 | 2/2004 | WO | WO 2010/033848 | 3/2010 |
| DE | | 2210891 | 9/1972 | WO | WO 2010/033850 | 3/2010 |
| DE | | 2852710 | 6/1980 | WO | WO 2010/033852 | 3/2010 |
| DE | | 3422202 | 12/1985 | WO | WO 2010/048493 | 4/2010 |
| DE | | 100610607 | 6/2002 | WO | WO 2010/078297 | 7/2010 |
| EA | | 819 | 4/2000 | WO | WO 2010/078298 | 7/2010 |
| EP | | 0 067 580 | 12/1982 | | | |
| EP | | 102828 | 3/1984 | | | |
| EP | | 0 138 463 | 4/1985 | | | |
| EP | | 0 225 146 | 6/1987 | | | |
| EP | | 0 259 927 | 3/1988 | | | |
| EP | | 0 723 930 | 7/1996 | | | |
| EP | | 1 001 002 | 5/2000 | | | |
| EP | | 1 741 673 | 6/2006 | | | |
| FR | | 797 089 | 4/1936 | | | |
| GB | | 593910 | 10/1947 | | | |
| GB | | 640907 | 8/1950 | | | |
| GB | | 676615 | 7/1952 | | | |
| GB | | 701 131 | 12/1953 | | | |
| GB | | 760627 | 11/1956 | | | |
| GB | | 798741 | 7/1958 | | | |
| GB | | 996327 | 6/1965 | | | |
| GB | | 1033764 | 6/1966 | | | |
| GB | | 1448562 | 9/1976 | | | |
| GB | | 1453081 | 10/1976 | | | |
| GB | | 1467219 | 3/1977 | | | |
| GB | | 1467995 | 3/1977 | | | |
| GB | | 1 599 932 | 7/1977 | | | |
| GB | | 2078251 | 1/1982 | | | |
| GB | | 2154600 | 9/1985 | | | |
| JP | | 54020003 | 2/1979 | | | |
| JP | | 56157493 | 12/1981 | | | |
| JP | | 62241991 | 10/1987 | | | |
| JP | | 62 257985 | 11/1987 | | | |
| JP | | 2000290659 | 10/2000 | | | |

OTHER PUBLICATIONS

U.S. Appl. No. 12/778,548, filed May 12, 2010, Robinson, et al.
U.S. Appl. No. 12/778,552, filed May 12, 2010, Robinson, et al.
Adsorption, http://en.wikipedia.org/wiki/Adsorption, pp. 1-8.
Amine gas treating, http://en.wikipedia.org/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm, pp. 1-5.
Gas separation, http://en.wikipedia.org/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.

Jensen, et al. Removal of K and Cl by leaching of straw char, *Biomass and Bioenergy*, vol. 20, pp. 447-457, (2001).

Mengjie, et al., "A potential renewable energy resource development and utilization of biomass energy", http://www.fao.org.docrep/T4470E/t4470e0n.htm, pp. 1-8.

Meyers, et al. Fly Ash as a Construction Material for Highways, A Manual. Federal Highway Administration, Report No. FHWA-IP-76-16, Washington, DC, 1976.

Moulton, Lyle K. "Bottom Ash and Boiler Slag", *Proceedings of the Third International Ash Utilization Symposium*, U.S. Bureau of Mines, Information Circular No. 8640, Washington, DC, 1973.

Natural gas processing, http://en.wikipedia.org/wiki/Natural_gas_processing, pp. 1-4.

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", *Fuel Processing Technology*, vol. 86, pp. 375-389, (2004).

Reboiler, http://en.wikipedia.org/wiki/Reboiler, pp. 1-4.

What is XPS?, http://www.nuance.northwestern.edu/KeckII/xps1.asp, pp. 1-2.

2.3 Types of gasifiers, http://www.fao.org/docrep/t0512e/T0512e0a.htm, pp. 1-6.

2.4 Gasification fuels, http://www.fao.org/docrep/t0512e/T0512e0b.htm#TopofPage, pp. 1-8.

2.5 Design of downdraught gasifiers, http://www.fao.org/docrep/t0512e/T0512e0c.htm#TopOfPage, pp. 1-8.

2.6 Gas cleaning and cooling, http://www.fao.org/docrep/t0512e0d.htm#TopOFPage, pp. 1-3.

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From a Thermally Ballasted Gasifier," Aug. 2005.

Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.

Coal Conversion Processes (Gasification), Encyclopedia of Chemical Technology, $4^{th}$ Edition, vol. 6, pp. 541-566.

Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.

Nahas, N.C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

"Integrate Gasification Combined Cycle (IGCC)," WorleyParsons Resources & Energy, http://www.worleyparsons.com/v5/page.aspx?id=164.

\* cited by examiner

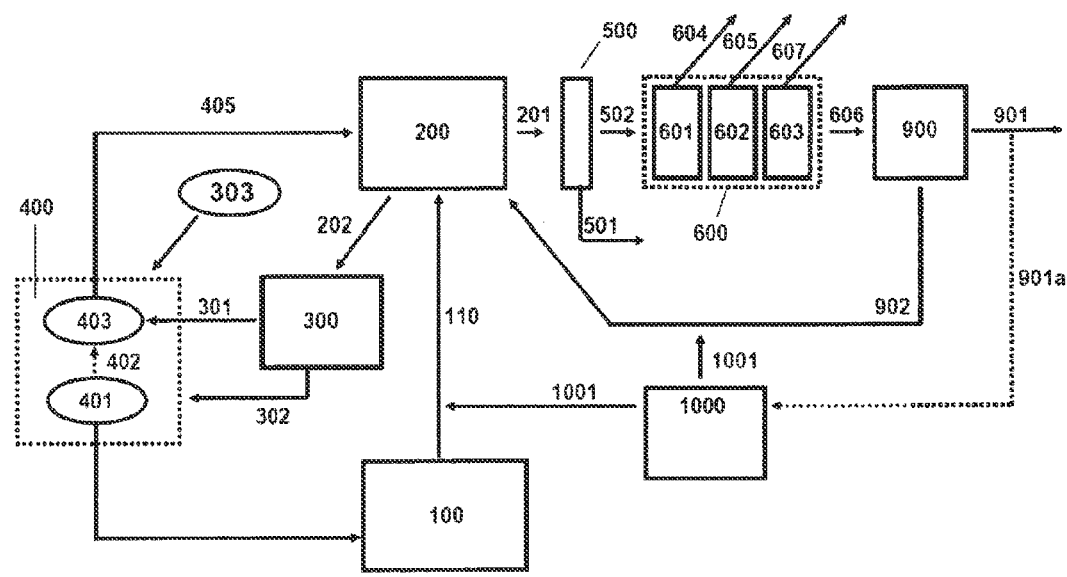

CO-FEED OF BIOMASS AS SOURCE OF MAKEUP CATALYSTS FOR CATALYTIC COAL GASIFICATION

CROSS-REFERENCE TO RELATED APPLICATIONS

This application claims priority under 35 U.S.C. §119 from U.S. Provisional Application Ser. No. 61/032,697 (filed Feb. 29, 2008), the disclosure of which is incorporated by reference herein for all purposes as if fully set forth.

FIELD OF THE INVENTION

The invention relates to continuous processes for converting a carbonaceous feedstock comprising biomass and non-biomass components as well as at least one gasification catalyst, into a plurality of gaseous products. Further, the invention relates to continuous gasification processes that use, as a gasification catalyst, alkali metal compounds recovered from char that forms in the reactor as a by-product of the gasification process, and a biomass co-feed as a source of makeup catalyst.

BACKGROUND OF THE INVENTION

In view of numerous factors such as higher energy prices and environmental concerns, the production of value-added gaseous products from lower-fuel-value carbonaceous feedstocks, such as biomass, coal and petroleum coke, is receiving renewed attention. The catalytic gasification of such materials to produce methane and other value-added gases is disclosed, for example, in U.S. Pat. Nos. 3,828,474, 3,998,607, 4,057,512, 4,092,125, 4,094,650, 4,204,843, 4,468,231, 4,500,323, 4,541,841, 4,551,155, 4,558,027, 4,606,105, 4,617,027, 4,609,456, 5,017,282, 5,055,181, 6,187,465, 6,790,430, 6,894,183, 6,955,695, US2003/0167961A1, US2006/0265953A1, US2007/000177A1, US2007/083072A1, US2007/0277437A1 and GB1599932.

An efficient process for the catalytic gasification of a carbonaceous material to synthetic natural gas generally requires the presence of a catalyst to encourage the formation of methane with respect to other products, such as syngas. It has generally been contemplated to provide such a catalyst from a source external to the gasification process, for example, by providing solutions or solid compositions of a catalyst which are acquired separately from the feedstocks, adding additional costs to the process. However, as certain types of feedstock can contain compounds having catalytic activity, there exists a need in the art to develop processes for the catalytic gasification of carbonaceous materials which take advantage of such intrinsic catalysts to enable lower cost per unit energy stored by increasing the overall utilization and conversion of the feedstocks in the process.

SUMMARY OF THE INVENTION

In a first aspect, the present invention provides a continuous process for converting a carbonaceous feedstock into a plurality of gaseous products, the process comprising the steps of: (a) providing a biomass material comprising a first source of an alkali metal; (b) providing a carbonaceous material other than the biomass material; (c) providing a gasification catalyst comprising a second source of an alkali metal; (d) preparing the carbonaceous feedstock by intimately mixing the biomass material, carbonaceous material and gasification catalyst; (e) reacting the carbonaceous feedstock in a gasification reactor in the presence of steam under suitable temperature and pressure to form: (i) a plurality of gaseous products comprising methane and at least one or more of hydrogen, carbon monoxide, carbon dioxide, hydrogen sulfide, ammonia, and other higher hydrocarbons, and (ii) a solid char comprising an alkali metal content from the gasification catalyst and the biomass material; (f) at least partially separating the plurality of gaseous products to produce a gas stream comprising a predominant amount of one of the gaseous products; and (g) recovering a substantial portion of the alkali metal content from the solid char, wherein: (1) at least a portion of the alkali metal content is not recovered from the solid char; (2) the gasification catalyst comprises the alkali metal content recovered from the solid char; and (3) a makeup catalyst comprising the biomass material, a makeup catalyst material, or both is provided in the carbonaceous feedstock in an amount to maintain a steady-state operational molar ratio of alkali metal atoms to carbon atoms in the carbonaceous feedstock, the steady-state operational molar ratio ranging from about 0.01 to about 0.10.

BRIEF DESCRIPTION OF THE DRAWINGS

The FIGURE depicts a schematic for a continuous process for converting a carbonaceous feedstock into a plurality of gaseous products that includes the recovery of alkali metal compounds from char for reuse as a catalyst, with a biomass co-feed as a makeup catalyst.

DETAILED DESCRIPTION

The present invention provides processes for the continuous catalytic conversion of a carbonaceous feedstock into a plurality of gaseous products with recovery and reuse of alkali metal used as the gasification catalyst and biomass which provides a separate source of alkali metal. The alkali metal is recovered from char that develops as a result of the catalyzed gasification of a carbonaceous material in a gasification reactor. The alkali metal is typically recovered as a carbonate, which may then be used as at least part of the gasification catalyst for a subsequent gasification. Because not all of the alkali metal used as a catalyst can be recovered from the solid char, an amount of biomass providing a separate source of alkali metal is added to the carbonaceous feedstock to make up for unrecovered alkali metal catalyst. Optionally, alkali metal hydroxide can be added to the recovered alkali metal carbonate which provides another makeup catalyst source for alkali metal unrecoverable from the char.

The present invention can be practiced, for example, using any of the developments to catalytic gasification technology disclosed in commonly owned US2007/0000177A1, US2007/0083072A1 and US2007/0277437A1; and U.S. patent application Ser. No. 12/178,380 (filed 23 Jul. 2008), Ser. No. 12/234,012 (filed 19 Sep. 2008) and Ser. No. 12/234,018 (filed 19 Sep. 2008). All of the above are incorporated by reference herein for all purposes as if fully set forth.

Moreover, the present invention can be practiced in conjunction with the subject matter of the following U.S. Patent Applications, each of which was filed on Dec. 28, 2008: Ser. No. 12/342,554, entitled "CATALYTIC GASIFICATION PROCESS WITH RECOVERY OF ALKALI METAL FROM CHAR"; Ser. No. 12/342,565, entitled "PETROLEUM COKE COMPOSITIONS FOR CATALYTIC GASIFICATION"; Ser. No. 12/342,578, entitled "COAL COMPOSITIONS FOR CATALYTIC GASIFICATION"; Ser. No. 12/342,596, entitled "PROCESSES FOR MAKING SYNTHESIS GAS AND SYNGAS-DERIVED PRODUCTS";

Ser. No. 12/342,608, entitled "PETROLEUM COKE COMPOSITIONS FOR CATALYTIC GASIFICATION"; Ser. No. 12/342,628, entitled "PROCESSES FOR MAKING SYNGAS-DERIVED PRODUCTS"; Ser. No. 12/342,663, entitled "CARBONACEOUS FUELS AND PROCESSES FOR MAKING AND USING THEM"; Ser. No. 12/342,715, entitled "CATALYTIC GASIFICATION PROCESS WITH RECOVERY OF ALKALI METAL FROM CHAR"; Ser. No. 12/342,736, entitled "CATALYTIC GASIFICATION PROCESS WITH RECOVERY OF ALKALI METAL FROM CHAR"; Ser. No. 12/343,143, entitled "CATALYTIC GASIFICATION PROCESS WITH RECOVERY OF ALKALI METAL FROM CHAR"; Ser. No. 12/343,149, entitled "STEAM GENERATING SLURRY GASIFIER FOR THE CATALYTIC GASIFICATION OF A CARBONACEOUS FEEDSTOCK"; and Ser. No. 12/343,159, entitled "CONTINUOUS PROCESSES FOR CONVERTING CARBONACEOUS FEEDSTOCK INTO GASEOUS PRODUCTS". All of the above are incorporated by reference herein for all purposes as if fully set forth.

Further, the present invention can be practiced in conjunction with the subject matter of the following U.S. Patent Applications, each of which was filed concurrently herewith; Ser. No. 12/395,293, entitled "PROCESSES FOR MAKING ABSORBENTS AND PROCESSES FOR REMUVING CONTAMTNANTS FROM FLUIDS USING THEM"; Ser. No. 12/395,309, entitled "STEAM GENERATION PROCESSES UTILIZING BIOMASS FEEDSTOCKS"; Ser. No. 12/395,320, entitled "REDUCED CARBON FOOTPRINT STEAM GENERATION PROCESSES"; Ser. No. 12/395,330, entitled "PROCESS AND APPARATUS FOR THE SEPARATION OF METHANE FROM A GAS STREAM"; Ser. No. 12/395,344, entitled "SELECTIVE REMOVAL AND RECOVERY OF ACID GASES FROM GASIFICATION PRODUCTS"; Ser. No. 12/395,348, entitled "COAL COMPOSITIONS FOR CATALYTIC GASIFICATION"; Ser. No. 12/395,353, entitled "COAL COMPOSITIONS FOR CATALYTIC GASIFICATION"; Ser. No. 12/395,381, entitled "COMPACTOR-FEEDER; Ser. No. 12/395,385, entitled "CARBONACEOUS FINES RECYCLE"; Ser. No. 12/395,429, entitled "BIOMASS CHAR COMPOSITIONS FOR CATALYTIC GASIFICATION"; Ser. No. 12/395,433, entitled "CATALYTIC GASIFICATION PARTICULATE COMPOSITIONS"; and Ser. No. 12/395,447, entitled "BIOMASSCOMPOSITIONS FOR CATALYTIC GASIFICATION"; All of the above are incorporated herein by reference for all purposes as if fully set forth.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc. are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The materials, methods, and examples herein are illustrative only and, except as specifically stated, are not intended to be limiting.

Continuous Process for Converting Carbonaceous Feedstock into Gaseous Products

The FIGURE provides a flow chart depicting one embodiment of a continuous process for converting carbonaceous feedstock into a plurality of gaseous products, where the gasification catalyst comprises alkali metal compounds recovered from the char, and biomass is used as a co-feed for a source of gasification catalyst that makes up for catalyst which is not recoverable from the char.

Alkali metal salts, particularly potassium salts, are useful as catalysts in catalytic gasification reactions. Alkali metal catalyst-loaded carbonaceous mixtures are generally prepared and then introduced into a gasification reactor, or can be formed in situ by introducing alkali metal catalyst and carbonaceous particles separately into the reactor.

After gasification, the alkali metal may exist in the char as species that are either soluble or insoluble. In particular, alkali metal can react with ash at temperatures above about 500-600° C. to form insoluble alkali metal aluminosilicates, such as kaliophilite. As an aluminosilicate, or other insoluble compounds, the alkali metal is ineffective as a catalyst.

Char is periodically removed from the gasification reactor through a solid purge. Because the char has a substantial quantity of soluble and insoluble alkali metal, it is desirable to recover the alkali metal from the char for reuse as a gasification catalyst. Catalyst loss in the solid purge must generally be compensated for by a reintroduction of additional catalyst, i.e. a catalyst make-up stream. Processes have been developed to recover alkali metal from the solid purge in order to reduce raw material costs and to minimize environmental impact of a catalytic gasification process; however some amount of the catalyst present in char will not be recoverable.

The invention provides processes for the continuous conversion of a carbonaceous feedstock into gaseous products, where the process includes recovering a substantial portion of the alkali metal from the solid char and using the recovered alkali metal compounds as a gasification catalyst in a subsequent gasification of a carbonaceous material, with the addition of biomass as a source of makeup catalyst. Optionally, the process can include an additional source of make-up gasification catalyst.

Catalytic Gasification Methods

The invention provides continuous integrated gasification processes for converting biomass and non-biomass to combustible gases, such as methane. Referring to the FIGURE, the gas utilized in the catalytic gasifier (200) for pressurization and reactions of the carbonaceous feedstock comprises steam, and optionally, other gases such as oxygen or air, carbon monoxide and hydrogen, and are supplied to the reactor according to methods known to those skilled in the art. For example, any of the steam boilers (100) known to those skilled in the art can supply steam (110) to the reactor. Such boilers can be powered, for example, through the use of any carbonaceous material (401) such as powdered coal, biomass etc. and including but not limited to rejected carbonaceous materials from the particulate composition preparation operation (e.g., uncatalyzed carbonaceous fines). Steam can also be supplied from a second gasification reactor coupled to a combustion turbine where the exhaust from the reactor is thermally exchanged to a water source and produce steam.

Recycled steam from other process operations can also be used for supplying steam to the reactor. For example, in the preparation of the catalyzed feedstock, when slurried particulate composition are dried with a fluid bed slurry drier, as discussed below, then the steam generated can be fed to the catalytic gasification reactor.

The small amount of required heat input for the catalytic coal gasification reaction can be provided by superheating a gas mixture of steam and recycle gas feeding the gasification reactor by any method known to one skilled in the art. In one method, compressed recycle gas of CO and $H_2$ can be mixed with steam and the resulting steam/recycle gas mixture can be further superheated by heat exchange with the gasification reactor effluent followed by superheating in a recycle gas furnace.

The catalytic gasification reactor (200) is typically operated at moderately high pressures and temperature, requiring introduction of a carbonaceous feedstock (405) and a gasification catalyst (e.g., an alkali metal gasification catalyst) to a reaction zone of the catalytic gasifier while maintaining the required temperature, pressure, and flow rate of the feedstock. Those skilled in the art are familiar with feed systems for providing feedstocks to high pressure and/or temperature environments, including, star feeders, screw feeders, rotary pistons, and lock-hoppers. It should be understood that the feed system can include two or more pressure-balanced elements, such as lock hoppers, which would be used alternately.

The carbonaceous feedstock and gasification catalyst may be introduced separately or combined as a single catalyzed feedstock (infra) and is generally provided to the catalytic gasifier (200) from a feedstock preparation operation (400). In some instances, the carbonaceous feedstock (405) can be prepared at pressure conditions above the operating pressure of catalytic gasifier. Hence, the carbonaceous feedstock (405) may be directly passed into the catalytic gasifier without further pressurization.

Any of several catalytic gasifiers (200) can be utilized in the process of the described herein. Suitable gasifiers include counter-current fixed bed, co-current fixed bed, fluidized bed, entrained flow, and moving bed reactors. A catalytic gasifier for gasifying liquid feeds, such as liquid petroleum residues, is disclosed in previously incorporated U.S. Pat. No. 6,955,695. The pressure in the catalytic gasifier (200) typically can be from about 10 to about 100 atm (from about 150 to about 1500 psig). The gasification reactor temperature can be maintained around at least about 450° C. or at least about 600° C. or at least about 900° C. or at least about 750° C. or about 600° C. to about 700° C.; and at pressures of at least about 50 psig, or at least about 200 psig, or at least about 400 psig, to about 1000 psig, or to about 700 psig, or to about 600 psig.

In one embodiment, a methane reformer (1000) can be optionally included in the process. For example, a methane reformer (1000) may be included in the process to supplement the recycle CO and $H_2$ stream or other exhaust gas streams, and/or steam stream (110) from the reactor to ensure that enough recycle gas is supplied to the reactor so that the net heat of reaction is as close to neutral as possible (only slightly exothermic or endothermic), in other words, that the catalytic gasifier is run under substantially thermally neutral conditions. In such instances, methane (901a) can be supplied for the reformer from the methane product (901), as described below.

Reaction of the carbonaceous feedstock (405) in the catalytic gasifier (200), in the presence of one or more gasification catalysts, provides a crude product gas and a char (202). The char (202) is removed from the catalytic gasifier is directed to a catalyst recovery and recycle process (300), as described herein, in a continuous or batch-wise manner. Methods for removing char are well known to those skilled in the art. One such method taught by EP-A-0102828, for example, can be employed. The char can be periodically withdrawn from the catalytic gasification reactor through a lock hopper system, although other methods are known to those skilled in the art.

Upon completion of catalyst recovery, both the char, substantially free of the gasification catalysts (302) as described herein, and the recovered catalyst (301) (as a solution or solid) can be directed to the feedstock preparation operation (400) comprising a carbonaceous feedstock preparation process (402), carbonaceous material (401), and carbonaceous feedstock (403). Additional sources (303) of alkali metal can be added to the carbonaceous feedstock as makeup catalyst, as described herein.

Crude product gas effluent leaving the catalytic gasifier (200) can pass through a portion of the reactor which serves as a disengagement zone where particles too heavy to be entrained by the gas leaving the reactor (i.e., fines) are returned to the fluidized bed. The disengagement zone can include one or more internal cyclone separators or similar devices for removing fines and particulates from the gas. The gas effluent (201) passing through the disengagement zone and leaving the catalytic gasifier generally contains $CH_4$, $CO_2$, $H_2$ and CO, $H_2S$, $NH_3$, other higher hydrocarbons, unreacted steam, entrained fines, and other contaminants such as COS.

The gas stream from which the fines have been removed (201) can then be passed through a heat exchanger (500) to cool the gas and the recovered heat can be used to preheat recycle gas and generate high pressure steam (501). Residual entrained fines can also be removed by any suitable means such as external cyclone separators, optionally followed by Venturi scrubbers. The recovered fines can be processed to recover alkali metal catalyst then passed to the slurry feedstock preparation process (402) or returned to the catalytic gasification reactor, or directly recycled back to feedstock preparation as described in previously U.S. patent application Ser. No. 12/395,385, entitled "CARBONACEOUS FINES RECYCLE".

The gas stream (502) from which the fines have been removed can be fed to a gas purification operation (600)

comprising COS hydrolysis reactors (601) for COS removal (sour process) and further cooled in a heat exchanger to recover residual heat prior to entering water scrubbers (602) for ammonia recovery, yielding a scrubbed gas comprising at least $H_2S$, $CO_2$, CO, $H_2$, and $CH_4$. Methods for COS hydrolysis are known to those skilled in the art, for example, see U.S. Pat. No. 4,100,256. The residual heat from the scrubbed gas can be used to generate low pressure steam.

Scrubber water (605) and sour process condensate (604) can be processed to strip and recover $H_2S$, $CO_2$ and $NH_3$; such processes are well known to those skilled in the art. $NH_3$ can typically be recovered as an aqueous solution (e.g., 20 wt %). Alternatively, scrubber water (605) and sour process condensate (604) can be returned to the slurry gasifier, thereby reducing overall process water usage and eliminating separate cleanup of these process streams.

A subsequent acid gas removal process (603) can be used to remove $H_2S$ and $CO_2$ from the scrubbed gas stream by a physical absorption method involving solvent treatment of the pas to give a cleaned gas stream. Such processes involve contacting the scrubbed gas with a solvent such as monoethanolamine, diethanolamine, methyldiethanolamine, diisopropylamine, diglycolamine, a solution of sodium salts of amino acids, methanol, hot potassium carbonate or the like. One method can involve the use of Selexol® (UOP LLC, Des Plaines, Ill. USA) or RECTISOL® (Lurgi AG, Frankfurt am Main, Germany) solvent having two trains; each train consisting of an $H_2S$ absorber and a $CO_2$ absorber. The spent solvent (607) containing $H_2S$, $CO_2$ and other contaminants can be regenerated by any method known to those skilled in the art, including contacting the spent solvent with steam or other stripping gas to remove the contaminants or by passing the spent solvent through stripper columns. Recovered acid gases can be sent for sulfur recovery processing; for example, any recovered $H_2S$ from the acid gas removal and sour water stripping can be converted to elemental sulfur by any method known to those skilled in the art. including the Claus process. Sulfur can be recovered as a molten liquid. Stripped water can be directed for recycled use in preparation of the first and/or second carbonaceous feedstock. One method for removing acid gases from the scrubbed gas stream is described in previously incorporated U.S. patent application Ser. No. 12/395,344, entitled "SELECTIVE REMOVAL AND RECOVERY OF ACID GASES FROM GASIFICATION PRODUCTS".

Advantageously, $CO_2$ generated in the process, can be recovered for subsequent use or sequestration, enabling a greatly decreased carbon footprint (as compared to direct combustion of the feedstock) as a result. See, for example, previously incorporated U.S. patent applications Ser. No. 12/365,309 entitled "STEAM GENERATION PROCESSES UTILIZING BIOMASS FEEDSTOCKS", and Ser. No. 12/395,320 entitled "REDUCED CARBON FOOTPRINT STEAM GENERATION PROCESSES".

The resulting cleaned gas stream (606) exiting the gas purification operation (600) contains mostly $CH_4$, $H_2$, and CO and, typically, small amounts of $CO_2$ and $H_2O$. The cleaned gas stream (606) can be further processed to separate and recover $CH_4$ by any suitable gas separation method (900) known to those skilled in the art including, but not limited to, cryogenic distillation and the use of molecular sieves or ceramic membranes, or via the generation of methane hydrate as disclosed in previously incorporated U.S. patent application Ser. No. 12/395,330 entitled "PROCESS AND APPARATUS FOR THE SEPARATION OF METHANE FROM A GAS STREAM".

Typically, two gas streams can be produced by the gas separation process (900), a methane product stream (901) and a syngas stream (902, $H_2$ and CO). The syngas stream (902) can be compressed and recycled. One option can be to recycle the syngas steam directly to the catalytic gasifier (200). As another option, the recycled syngas can be combined with exhaust gas from a slurry gasifier, and the mixture introduced into the catalytic gasification reactor. In another case the recycled syngas can be directed into the slurry gasifier. When a fluid bed reactor is utilized for the slurry gasifier, the syngas may provide fluidization or aid in fluidization of the reaction bed. See, for example, previously incorporated U.S. patent application Ser. No. 12/343,149.

If necessary, a portion of the methane product (901a) can be directed to a reformer, as discussed previously. The need to direct a portion of the methane product can be controlled, for example, by the ratio of CO to $H_2$ in the exhaust gas from the slurry gasifier (100). Particularly, methane can be directed to a reformer to supplement (1001) the exhaust gas (110) supplied to the catalytic gasification reactor and, in some instance, provide a ratio of about 3:1 of $H_2$ to CO in the feed to the catalytic gasification reactor. A portion of the methane product can also be used as plant fuel for a gas turbine.

Recovery of Alkali Metal from Solid Char

Recovery of the alkali metal from the solid char as an alkali metal carbonate includes, but is not limited to: recovery of soluble and insoluble alkali metal from the insoluble char particulate; separating the liquid portion comprising a substantial portion of the alkali metal from the insoluble matter that has been substantially depleted of alkali metal; and concentrating the alkali metal solution as an alkali metal carbonate solution.

The solid char comprises alkali metal as soluble compounds and insoluble compounds. The relative proportion of soluble to insoluble alkali metal in the char will depend, at least in part, on the composition of the carbonaceous feedstock. For example, the gasification of carbonaceous materials high in alumina content, such as coal and tar sands petcoke, can result in the formation of significant amounts of insoluble alkali metal aluminosilicates in the char. In another example, gasification of carbonaceous materials low in alumina, such as resid petcoke, may form few insoluble alkali metal compounds in the char. Selecting an appropriate method for recovering the alkali metal from the char depends, to an extent, on the quantity of insoluble alkali metal compounds in the solid char.

Methods of recovering alkali metal from insoluble matter, such as char, are well known in the art. Particularly useful recovery and recycling processes are described in U.S. Pat. No. 4,459,138, as well as previously incorporated U.S. Pat. No. 4,057,512 and US2007/0277437A1, and previously incorporated U.S. patent application Ser. Nos. 12/342,554, 12/342,715, 12/342,736 and 12/343,143. While reference to those documents can be had for particular process details, examples of suitable methods include, but are not limited to, washing the char particulate with hot water, subjecting the char particulate to an alkaline digestion process, or combinations thereof. When the char comprises few insoluble alkali metal compounds, methods involving hot water may, in many instances, be sufficient to recover a substantial portion of the alkali metal from the char. But when the char has a significant amount of insoluble alkali metal, alkaline digestion methods, for example, may be more appropriate.

Alternatively if the char is derived primarily from biomass, a "biomass char," a leachate can be prepared from the biomass char where soluble alkali metal compounds can be extracted from the char. As used herein, a "biomass char" means a char which is produced from the partial or complete gasification or combustion of a carbonaceous feedstock comprising biomass, for example, a feedstock comprising at least about 50% biomass by weight, or at least about 60%, at least about 70%, at least about 80%, at least about 90%, at least about 95%, at least about 96%, at least about 97%, at least about 98%, or at least about 99% biomass by weight. Any of the methods for leachate preparation and extraction methods can be used such as, for example, the methods described in previously incorporated U.S. patent application Ser. No. 12/395,433, entitled "CATALYTIC GASIFICATION PARTICULATE COMPOSITIONS". Briefly, the biomass char is reduced to a particle size distribution of about 25 to 2500 microns. For purposes of this invention, there are no particular limits on the ratio of aqueous medium to char, or on the temperature of the aqueous medium. In some embodiments, however, the wt/wt ratio of water in the aqueous medium to the water-insoluble component of the char ranges from about 3:1, or from about 5:1, up to about 7:1, or up to about 15:1. Additionally, in some embodiments, the aqueous medium has a temperature that ranges from about 95° C. up to about 110° C. or up to about 140° C. up to about 200° C. or up to about 300° C. The pressure need not be elevated above atmospheric pressure. In some embodiments, however, pressures are higher than atmospheric pressure. For example, the pressure may be up to about 25 psig, or up to about 40 psig, or up to about 60 psig, or up to about 80 psig, or up to about 400 psig. The process can occur under a stream of gas that is substantially free of oxygen or other oxidants, and may optionally comprise carbon dioxide. Alternatively biomass char may be recovered and utilized, itself, as part of a carbonaceous feedstock, as described in previously incorporated U.S. patent application Ser. No. 12/395,429, entitled "BIOMASS CHAR COMPOSITIONS FOR CATALYTIC GASIFICATION".

After the alkali metal has been recovered from the solid char, the liquid portion of the char slurry is typically separated from the insoluble matter. The separation and recovery of the liquid portion from the insoluble matter may be carried out by typical methods of separating a liquid from a solid particulate. Such methods include, but are not limited to, filtration (gravity or vacuum), centrifugation, decantation, and use of a fluid press. In some embodiments, the solid particulate is washed with water to ensure maximal transfer of the alkali metal into the separated liquid.

In some embodiments, the recovered liquid comprising the recovered alkali metal is concentrated by removal of water. Suitable methods of removing water include, but are not limited to, various evaporation techniques. In some embodiments, evaporation will reduce the amount of water in the recovered solution by an amount in the range of about 40% to about 60%, based on the total moles of water present in the solution prior to evaporation.

Carbonation of the recovered liquid solution results in the recovery of the alkali metal as an alkali metal carbonate. Previously incorporated US2007/0277437A1 provides a description of a suitable means of carbonating the recovered solution and precipitating out the alkali metal carbonate. In some embodiments, carbonation occurs by passing the recovered solution through a carbonator equipped with multiple trays, baffles, or packing material to ensure good contact between the liquid and the carbon dioxide gas. In the presence of carbon dioxide gas, the alkali metal precipitates out of the solution as an alkali metal carbonate. This alkali metal carbonate is collected for reuse as a gasification catalyst.

The recovery step results in the recovery of a substantial portion of the alkali metal from the solid char as an alkali metal carbonate. In some embodiments, about 60% or more, or about 70% or more, or about 80% or more, or about 85% or more, or about 90% or more of the alkali metal from the solid char is recovered as alkali metal carbonate, based on the total moles of alkali metal atoms originally present in the solid char.

The recovery step will typically not recover all alkali metal from the solid char, leaving an insubstantial portion of alkali metal that is not recovered from the char. In some embodiments, about 40% or less, or about 30% or less, or about 20% or less, or about 15% or less, or about 10% or less, of alkali metal is not recovered from the char, based on the total number of moles of alkali metal atoms originally present in the solid char.

The recovered alkali metal from the char is used to provide the gasification catalyst component of the carbonaceous feedstock used in the continuous process of the invention. The gasification catalyst, carbonaceous material other than biomass, and biomass material comprising another source of an alkali metal are mixed to prepare a carbonaceous feedstock, as described herein.

Catalyst Make-Up

In a continuous process, an alkali metal used as a gasification catalyst comprises alkali metal that has been recovered from the solid char. In some embodiments, the alkali metal is a carbonate such as, for example, potassium carbonate and the makeup catalyst comprises biomass which contains a source of alkali metal. In one embodiment, the makeup catalyst comprises biomass and an optional additional makeup catalyst material such as, for example, a makeup potassium hydroxide or potassium carbonate, or both. "Makeup catalyst material" as used herein means a source of alkali metal that does not comprise biomass.

Because an insubstantial portion of the alkali metal is not recovered from the solid char, discussed above, the gasification catalyst may also comprise biomass as a source of makeup catalyst, added in an amount to maintain the steady-state operational molar ratio. Typically, the quantity of the added biomass, as makeup catalyst, maintains the alkali metal component in the feedstock in an amount sufficient to provide a ratio of alkali metal atoms to carbon atoms in a steady-state molar ratio in the range of from about 0.01 to about 0.1, or in a range from about 0.01 to about 0.10, or in a range from about 0.01 to about 0.05.

Char

The term "char" as used herein includes mineral ash, unconverted carbonaceous material, and water-soluble alkali metal compounds and water-insoluble alkali metal compounds bound within the other solids. The char produced in the gasification reactor typically is removed from the gasification reactor for sampling, purging, and/or catalyst recovery. Methods for removing char are well known to those skilled in the art. One such method, taught by EP-A-0102828, for example, can be employed. The char can be periodically withdrawn from the gasification reactor through a lock hopper system, although other methods are known to those skilled in the art. Biomass char is discussed more particularly, above.

Biomass

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and *miscanthus* (e.g., *Miscanthus x gigan-*

*teus*). Biomass further include wastes from agricultural cultivation, processing, and/or degradation such as corn cobs and husks, corn stover, straw, nut shells, vegetable oils, canola oil, grapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

For purposes of this invention, biomass comprises an alkali metal content sufficient to constitute makeup catalyst.

Non-Biomass

The term "non-biomass" or "carbonaceous material other than biomass," as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues, or mixtures thereof.

The term "carbonaceous feedstock" as used herein refers to a carbonaceous material that is used as a feedstock in a catalytic gasification reaction. The carbonaceous feedstock can be formed, for example, from biomass or non-biomass, such as coal, petroleum coke, liquid petroleum residues, asphaltenes or mixtures thereof. The carbonaceous feedstock can come from a single source, or from two or more sources. For example, the carbonaceous feedstock can be formed from biomass and one or more tar sands petcoke materials, one or more coal materials, or a mixture of the two. In one embodiment of the invention, the carbonaceous feedstock is biomass and coal or petroleum coke, or a mixture thereof.

The term "petroleum coke" as used herein includes both (i) the solid thermal decomposition product of high-boiling hydrocarbon fractions obtained in petroleum processing (heavy residues—"resid petcoke") and (ii) the solid thermal decomposition product of processing tar sands (bituminous sands or oil sands—"tar sands petcoke"). Such carbonization products include, for example, green, calcined, needle and fluidized bed petroleum coke.

Resid petcoke can be derived from a crude oil, for example, by coking processes used for upgrading heavy-gravity residual crude oil, which petroleum coke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as compounds of silicon and/or aluminum.

The petroleum coke (either resid petcoke or tar sands petcoke) can comprise at least about 70 wt % carbon, at least about 80 wt % carbon, or at least about 90 wt % carbon, based on the total weight of the petroleum coke. Typically, the petroleum coke comprises less than about 20 wt % percent inorganic compounds, based on the weight of the petroleum coke.

Petroleum coke in general has an inherently low moisture content typically in the range of from about 0.2 to about 2 wt %. (based on total petroleum coke weight); it also typically has a very low water soaking capacity to allow for conventional catalyst impregnation methods.

The term "liquid petroleum residue" as used herein includes both (i) the liquid thermal decomposition product of high-boiling hydrocarbon fractions obtained in petroleum processing (heavy residues—"resid liquid petroleum residue") and (ii) the liquid thermal decomposition product of processing tar sands (bituminous sands or oil sands—"tar sands liquid petroleum residue"). The liquid petroleum residue is substantially non-solid; for example, it can take the form of a thick fluid or a sludge.

Resid liquid petroleum residue can also be derived from a crude oil, for example, by processes used for upgrading heavy-gravity crude oil distillation residue. Such liquid petroleum residue contains ash as a minor component, typically about 1.0 wt % or less, and more typically about 0.5 wt % of less, based on the weight of the residue. Typically, the ash in such lower-ash residues predominantly comprises metals such as nickel and vanadium.

Tar sands liquid petroleum residue can be derived from an oil sand, for example, by processes used for upgrading oil sand. Tar sands liquid petroleum residue contains ash as a minor component, typically in the range of about 2 wt % to about 12 wt %, and more typically in the range of about 4 wt % to about 12 wt %, based on the overall weight of the residue. Typically, the ash in such higher-ash residues predominantly comprises materials such as compounds of silicon and/or aluminum.

Asphaltenes typically comprise aromatic carbonaceous solids at room temperature, and can be derived, from example, from the processing of crude oil and crude oil tar sands.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on total coal weight. Examples of useful coals include, but are not limited to, Illinois #6, Pittsburgh #8, Beulah (N. Dak.), Utah Blind Canyon, and Powder River Basin (PRB) coals. Anthracite, bituminous coal, sub-bituminous coal, and lignite coal may contain about 10 wt %, about 5 to about 7 wt %, about 4 to about 8 wt %, and about 9 to about 11 wt %, ash by total weight of the coal on a dry basis, respectively. However, the ash content of any particular coal source will depend on the rank and source of the coal, as is familiar to those skilled in the art [see, for example, *Coal Data: A Reference*, Energy Information Administration, Office of Coal, Nuclear, Electric and Alternate Fuels, U.S. Department of Energy, DOE/EIA-0064(93), February 1995].

The term "ash" as used herein includes inorganic compounds that occur within the carbon source. The ash typically includes compounds of silicon, aluminum, calcium, iron, vanadium, sulfur, and the like. Such compounds include inorganic oxides, such as silica, alumina, ferric oxide, etc. but may also include a variety of minerals containing one or more of silicon, aluminum, calcium, iron, and vanadium. The term "ash" may be used to refer to such compounds present in the carbon source prior to gasification, and may also be used to refer to such compounds present in the char after gasification.

In some embodiments of the invention, the carbonaceous feedstock comprises biomass and petroleum coke, for example, as tar sands petcoke, resid petcoke, or combinations thereof. In some embodiments, the carbonaceous feedstock comprises biomass and a coal or a mixture of different coals. The carbonaceous feedstock can also comprise various mixtures of biomass and one or more petcokes and one or more coals.

Typically, the carbonaceous feedstock sources can be supplied as a fine particulate having an average particle size of from about 25 microns, or from about 250 microns, up to about 500 microns, or up to about 2500 microns. One skilled in the art can readily determine the appropriate particle size for the individual particulates and the particulate composition. For example, when a fluid bed gasification reactor is used, the particulate composition can have an average particle size which enables incipient fluidization of the particulate composition at the gas velocity used in the fluid bed gasification reactor.

The ash content of the carbonaceous feedstock can be, for example, about 20 wt % or less, about 15 wt % or less, about 10 wt % or less, or about 5 wt % or less, depending on the starting ash in the coke source. In certain embodiments, the carbonaceous feedstock has a carbon content ranging from about 75 wt %, or from about 80 wt %, or from about 85 wt %, or from about 90 wt %, up to about 95 wt %, based on the weight of the feedstock.

The ash produced from a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash [Meyers, et al. *Fly Ash. A Highway Construction Material*. Federal Highway Administration, Report No. FHWA-IP-76-16, Washington, D.C. 1976].

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. [Moulton, Lyle K. "Bottom Ash and Boiler Slag," *Proceedings of the Third International Ash Utilization Symposium*. U.S. Bureau of Mines, Information Circular No. 8640, Washington, D.C. 1973.]

Alkali Metal Compounds

As used herein, the term "alkali metal compound" refers to a free alkali metal, as a neutral atom or ion, or to a molecular entity, such as a salt, that contains an alkali metal. Additionally, the term "alkali metal" may refer either to an individual alkali metal compound, as heretofore defined, or may also refer to a plurality of such alkali metal compounds. An alkali metal compound capable of being substantially solubilized by water is referred to as a "soluble alkali metal compound." Examples of a soluble alkali metal compound include free alkali metal cations and water-soluble alkali metal salts, such as potassium carbonate, potassium hydroxide, and the like. An alkali metal compound incapable of being substantially solubilized by water is referred to as an "insoluble alkali metal compound." Examples of an insoluble alkali metal compound include water-insoluble alkali metal salts and/or molecular entities, such as potassium aluminosilicate.

Gasification Catalyst

The term "gasification catalyst" as used herein is a composition that catalyzes the gasification of the carbonaceous feedstock. The catalyst typically comprises an alkali metal component, as alkali metal and/or a compound containing alkali metal.

Suitable alkali metals are selected from the group consisting of lithium, sodium, potassium, rubidium, cesium, and mixtures thereof. Particularly useful are potassium sources. Suitable alkali metal compounds are selected from the group consisting of alkali metal carbonates, hydroxides, bicarbonates, formates, oxalates, amides, acetates, sulfides, halides, and nitrates. For example, the catalyst can comprise one or more of $Na_2CO_3$, $K_2CO_3$, $Rb_2CO_3$, $Li_2CO_3$, $Cs_2CO_3$, NaOH, KOH, RbOH, LiOH, CsOH, and particularly, potassium carbonate and/or potassium hydroxide. In some embodiments, the gasification catalyst comprises potassium carbonate and potassium hydroxide. In a some further embodiments, the ratio of potassium carbonate to potassium hydroxide ranges from about 1:1, or from about 3:1, or from about 5:1, or from about 7:1, to about 12:1, or to about 15:1, or to about 25:1, or to about 50:1, based on the relative number of moles of potassium. In some embodiments, the ratio of potassium carbonate to potassium hydroxide is about 9:1, based on the relative number of moles of potassium.

In continuous processes of the invention, an alkali metal used as a gasification catalyst comprises alkali metal that has been recovered from the solid char. Because at least a portion of the alkali metal is not recovered from the solid char, and in view of other process losses that inevitably occur in most industrial processes, the gasification catalyst will also comprise a makeup catalyst added in an amount to maintain the steady-state operational molar ratio. In accordance with the present invention, biomass provides a source of alkali metal that comprises the makeup catalyst. Optionally, the makeup catalyst can also include an additional makeup catalyst source such as, for example, potassium hydroxide.

Co-catalysts or other catalyst additives may be utilized, as disclosed in various of the documents incorporated by reference herein.

Catalyst-Loaded Carbonaceous Feedstock

Each of the biomass and non-biomass sources can be supplied as a fine particulate having an average particle size of from about 25 microns, or from about 45 microns, up to about 2500 microns, or up to about 500 microns. One skilled in the art can readily determine the appropriate particle size for the individual particulates and the carbonaceous feedstock. For example, when a fluid bed gasification reactor is used, the carbonaceous feedstock can have an average particle size which enables incipient fluidization of the carbonaceous feedstock at the gas velocity used in the fluid bed gasification reactor.

The carbonaceous feedstock further comprises a gasification catalyst. Typically, such gasification catalysts can comprise a source of at least one alkali metal, as discussed above, and is present in an amount sufficient to provide, a ratio of alkali metal atoms to carbon atoms in the particulate composition ranging from about 0.01, or from about 0.02, or from about 0.03, or from about 0.04, to about 0.10, or to about 0.09, or to about 0.06, or to about 0.07, or to about 0.06.

The ratio of the biomass and non-biomass in the carbonaceous feedstock can be selected based on technical considerations, processing economics, availability, and proximity of the non-biomass and biomass sources. As discussed above, the biomass provides a separate source of alkali metal and is used as a gasification catalyst makeup to account for catalyst lost during the catalyst recovery processes from char. The availability and proximity of the sources for the carbonaceous feedstock affect the price of the feeds, and thus, the overall production costs of the catalytic gasification process. For example, the biomass and the non-biomass can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions and the amount of makeup catalyst required in the carbonaceous feedstock.

The alkali metal component, recovered from the char, may be loaded onto the biomass or non-biomass; however, the alkali metal component may be blended into the carbonaceous feedstock as a separate particulate source as well. In one embodiment, at least the non-biomass particulate of the carbonaceous feedstock comprises a gasification catalyst and optionally, a co-catalyst/catalyst additive as discussed previously. In another embodiment, both the biomass and non-biomass particulates comprise a gasification catalyst.

More significantly, the biomass and non-biomass sources, as well as the ratio of the biomass to the non-biomass, can be used to control other material characteristics of the feedstock blend.

In preparing the carbonaceous feedstock for use in the processes of the invention, the ash content of the biomass and non-biomass particulates can be selected to be, for example, to be about 20 wt % or less, or about 15 wt % or less, or about 10 wt % or less, or about 5 wt % or less, depending on ratio of the particulates and/or the starting ash in the non-biomass source. In other embodiments, the resulting carbonaceous feedstock can comprise an ash content ranging from about 5 wt %, or from about 10 wt %, to about 20 wt %, or to about 15 wt %, based on the weight of the particulate composition. In other embodiments, the ash content of the particulate composition can comprise less than about 20 wt %, or less than about 15 wt %, or less than about 10 wt %, or less than about 8 wt %, or less than about 6 wt % alumina, based on the weight of the ash. In certain embodiments, the resulting particulate composition can comprise an ash content of less than about 20 wt %, based on the weight of the particulate composition where the ash content of the particulate composition comprises less than about 20 wt % alumina, or less than about 15 wt % alumina, based on the weight of the ash.

Additionally, the resulting particulate compositions can have a significantly higher % carbon, and thus btu/lb value and methane product per unit weight of the particulate composition. In certain embodiments, the resulting particulate composition has a carbon content ranging from about 75 wt %, or from about 80 wt %, or from about 85 wt %, or from about 90 wt %, up to about 95 wt %, based on the combined weight of the non-biomass and biomass.

Methods for Making the Carbonaceous Feedstock

The biomass and non-biomass sources typically require initial processing to prepare the carbonaceous feedstock for gasification. Each component of the carbonaceous feedstock may be separately processed, for example, to crush the sources to prepare appropriately sized particulates and/or to add one or more gasification catalysts, and subsequently mixed.

Each of the carbonaceous materials (i.e., biomass and non-biomass) can be prepared via crushing and/or grinding, either separately or together, according to any methods known in the art, such as impact crushing and wet or dry grinding to yield particulates. Depending on the method utilized for crushing and/or grinding of the biomass and non-biomass sources, the resulting particulates may be sized (i.e., separated according to size) to provide an appropriate feedstock.

Any method known to those skilled in the art can be used to size the particulates. For example, sizing can be preformed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the biomass and non-biomass particulates. Classification equipment can include ore sorters, gas cyclones, hydrocyclones, rake classifiers, rotating trommels, or fluidized classifiers. The biomass and non-biomass can be also sized or classified prior to grinding and/or crushing.

Additional feedstock processing steps may be necessary depending on the qualities of biomass and non-biomass sources. Biomass may contain high moisture contents, such as green plants and grasses, can require drying prior to crushing; likewise, non-biomass such as high-moisture coals, can require drying prior to crushing. Some caking coals can require partial oxidation to simplify gasification reactor operation. Non-biomass feedstocks deficient in ion-exchange sites, such as anthracites or low-sulfur petroleum cokes, can be pre-treated to create additional ion-exchange sites to facilitate catalysts loading and/or association. Such pre-treatments can be accomplished by any method known to the art that creates ion-exchange capable sites and/or enhances the porosity of the feedstock (see, for example, previously incorporated U.S. Pat. No. 4,468,231 and GB1599932). Often, pre-treatment is accomplished in an oxidative manner using any oxidant known to the art.

In one example, the non-biomass and/or biomass is wet ground and sized (e.g., to a particle size distribution of 25 to 2500 microns) and then drained of its free water (i.e., dewatered) to a wet cake consistency. Examples of suitable methods for the wet grinding, sizing, and dewatering are known to those skilled in the art; for example, see Examples of suitable methods for the wet grinding, sizing, and dewatering are known to those skilled in the art; for example, see previously incorporated U.S. patent application Ser. No. 12/178,380.

The filter cakes of the non-biomass and/or biomass particulates formed by the wet grinding in accordance with one embodiment of the present disclosure can have a moisture content ranging from about 40% to about 60%, about 40% to about 55%, or below 50%. It will be appreciated by one of ordinary skill in the art that the moisture content of dewatered wet ground non-biomass and/or biomass particulates depends on the particular type of non-biomass or biomass, the particle size distribution, and the particular dewatering equipment used.

The non-biomass and/or biomass particulates may subsequently treated to associate at least a first catalyst (e.g., gasification catalyst) therewith, which is recovered from solid char. Optionally, a second catalytic component (e.g., a second gasification catalyst or a co-catalyst) can be provided to one or more of the particulates; in such instances, the particulates can be treated in separate processing steps to provide the first catalyst and second catalysts. For example, the primary gasification catalyst comprising the alkali metal content recovered from solid char can be supplied to a first non-biomass and/or biomass particulate (e.g., a potassium and/or sodium source), followed by a separate treatment to provide a calcium gasification co-catalyst source to the first non-biomass and/or biomass particulate. Alternatively, the first and second catalysts can be provided as a mixture in a single treatment to a particulate; or a first particulates (e.g., the non-biomass) may be treated with a first catalyst and a second particulate (e.g., biomass) may be treated with a second catalyst and the two treated particulates blended. (see, previously incorporated US2007/0000177A1.

Any methods known to those skilled in the art can be used to associate one or more gasification catalysts with the non-biomass and/or biomass particulates. Such methods include but are not limited to, admixing with a solid catalyst source and impregnating the catalyst on to particulates. Several impregnation methods known to those skilled in the art can be employed to incorporate the gasification catalysts. These methods include but are not limited to, incipient wetness impregnation, evaporative impregnation, vacuum impregnation, dip impregnation, ion exchanging, and combinations of these methods.

In one embodiment, an alkali metal gasification catalyst can be impregnated into one or more of the particulates by slurrying with a solution (e.g., aqueous) of the catalyst. When a particulate is slurried with a solution of the catalyst and/or co-catalyst, the resulting slurry can be dewatered to provide a catalyzed particulate, again typically, as a wet cake. The catalyst solution for slurrying the particulate can be prepared from any catalyst source in the present methods, including fresh or make-up catalyst and recycled catalyst or catalyst solution (infra). Methods for dewatering the slurry to provide a wet cake of the catalyzed particulate include filtration (gravity or vacuum), centrifugation, and a fluid press.

One particular method suitable for combining a coal particulate with a gasification catalyst to provide a catalyzed particulate is via ion exchange as described in previously incorporated U.S. patent application Ser. No. 12/178,380. Catalyst loading by ion exchange mechanism may be maximized based on adsorption isotherms specifically developed for the coal, as discussed in the incorporated reference. Such loading provides a catalyzed particulate as a wet cake. Additional catalyst retained on the ion-exchanged particulate wet cake, including inside the pores, can be controlled so that the total catalyst target value can be obtained in a controlled manner. The catalyst loaded and dewatered wet cake may contain, for example, about 50% moisture. The total amount of catalyst loaded can be controlled by controlling the concentration of catalyst components in the solution, as well as the contact time, temperature and method, as can be readily determined by those of ordinary skill in the relevant art based on the characteristics of the starting coal source.

Alternatively, the slurried particulates may be dried with a fluid bed slurry drier (i.e., treatment with superheated steam to vaporize the liquid), or the solution evaporated, to provide a dry catalyzed particulate.

The catalyzed coal particulates prepared by the ion exchange process referenced above typically comprise greater than about 50%, greater than about 70%, greater than about 85%, or greater than about 90% of the total amount of the loaded catalyst associated with the particulate, for instance, as ion-exchanged catalyst on acidic functional groups of the particulates. The percentage of total loaded catalyst that is associated with the particulates can be determined according to methods known to those skilled in the art.

Separate biomass and non-biomass particulates and/or catalyzed biomass and/or non-biomass particulates can be blended appropriately to control, for example, the total catalyst loading or other qualities of the particulate composition, as discussed previously. The appropriate ratios of the separate particulates will depend on the qualities of the feedstocks as well as the desired properties of the particulate composition. For example, a biomass particulate and a catalyzed non-biomass particulate can be combined in such a ratio to yield a particulate composition having a predetermined ash content, as discussed previously.

Separate particulates, as one or more dry particulates and/or one or more wet cakes, can be combined by any methods known to those skilled in the art including, but not limited to, kneading, and vertical or horizontal mixers, for example, single or twin screw, ribbon, or drum mixers. The resulting particulate composition can be stored for future use or transferred to a feed operation for introduction into a gasification reactor. The particulate composition can be conveyed to storage or feed operations according to any methods known to those skilled in the art, for example, a screw conveyer or pneumatic transport.

Ultimately, the particulate composition may be dried, under a flow of an inert gas, with a fluid bed slurry drier (i.e., treatment with superheated steam to vaporize the liquid), or the solution evaporated, to provide the particulate composition.

For example, a particulate composition may be prepared according to the preceding methods by providing a first particulate carbonaceous feedstock that is a biomass, a second particulate carbonaceous feedstock that is a non-biomass, and a gasification catalyst. The first particulate carbonaceous feedstock and second particulate carbonaceous feedstock can be contacted as a blend with an aqueous solution comprising gasification catalyst to form a slurry. The resulting slurry can be dewatered to form a catalyst-loaded wet cake, and the wet cake can be thermally treated under a flow of inert dry gas to form the particulate composition.

In another example, a particulate composition may be prepared according to the preceding methods by providing a first particulate carbonaceous feedstock that is a biomass, a second particulate carbonaceous feedstock that is a non-biomass, and a gasification catalyst. The first particulate carbonaceous feedstock can be contacted with an aqueous solution comprising gasification catalyst to form a slurry, and the slurry dewatered to form a catalyst-loaded wet cake. The catalyst-loaded wet cake can be mixed with the second particulate carbonaceous feedstock to form a mixture. Finally, the mixture can be thermally treated, under a flow of inert dry gas, to form the particulate composition.

In another yet example, a particulate composition may be prepared according to the preceding methods by providing a first particulate carbonaceous feedstock that is a biomass, a second particulate carbonaceous feedstock that is a non-biomass, and a gasification catalyst. The second particulate carbonaceous feedstock can be contacted with an aqueous solution comprising gasification catalyst to form a slurry and the slurry dewatered to form a catalyst-loaded wet cake. The catalyst-loaded wet cake can be mixed with the first particulate carbonaceous feedstock to form a mixture, and the mixture thermally treated under a flow of inert dry gas to form the particulate composition.

The carbonaceous feedstock should ultimately have a particle size distribution suitable for gasification in a fluidized bed zone, and a moisture content of less than about 6 wt % based on the weight of the carbonaceous feedstock.

We claim:

1. A continuous process for converting a carbonaceous feedstock into a plurality of gaseous products, the process comprising the steps of:
    (a) providing a biomass material comprising a first source of an alkali metal;
    (b) providing a carbonaceous material other than the biomass material;

(c) providing a gasification catalyst comprising a second source of an alkali metal;
(d) preparing the carbonaceous feedstock by intimately mixing the biomass material, carbonaceous material and gasification catalyst;
(e) reacting the carbonaceous feedstock in a gasification reactor in the presence of steam under suitable temperature and pressure to form:
  (i) a plurality of gaseous products comprising methane and at least one or more members selected from the group consisting of hydrogen, carbon monoxide, carbon dioxide, hydrogen sulfide, ammonia, and other higher hydrocarbons, and
  (ii) a solid char comprising an alkali metal content from the gasification catalyst and the biomass material;
(f) at least partially separating the plurality of gaseous products to produce a gas stream comprising a predominant amount of one of the gaseous products; and
(g) recovering a substantial portion of the alkali metal content from the solid char, wherein:
(1) at least a portion of the alkali metal content is not recovered from the solid char;
(2) the gasification catalyst comprises the alkali metal content recovered from the solid char; and
(3) a makeup catalyst comprising the biomass material, a makeup catalyst material, or both is provided in the carbonaceous feedstock in an amount to maintain a steady-state operational molar ratio of alkali metal atoms to carbon atoms in the carbonaceous feedstock, the steady-state operational molar ratio ranging from about 0.01 to about 0.10.

2. The process according to claim 1, wherein the carbonaceous feedstock comprises anthracite, bituminous coal, sub-bituminous coal, lignite, petroleum coke, asphaltenes, liquid petroleum residues, or mixtures thereof.

3. The process according to claim 2, wherein the petroleum coke comprises petroleum coke derived from tar sands or petroleum coke derived from petroleum refining.

4. The process according to claim 1, wherein the carbonaceous feedstock has a particle size distribution suitable for gasification in a fluidized bed zone and a moisture content of less than about 6 wt % based on the weight of the carbonaceous feedstock.

5. The process according to claim 1, wherein the carbonaceous feedstock has a particle size distribution ranging from about 25 microns to about 2500 microns.

6. The process according to claim 1, wherein the makeup catalyst material comprises potassium hydroxide or potassium carbonate, or both.

* * * * *